US012126769B1

(12) United States Patent
Koul et al.

(10) Patent No.: US 12,126,769 B1
(45) Date of Patent: Oct. 22, 2024

(54) PLATFORM FOR CALL TRANSCRIPTION AND SUMMARIZATION USING GENERATIVE ARTIFICIAL INTELLIGENCE

(71) Applicant: Acqueon Inc., Irving, TX (US)

(72) Inventors: Ashish Koul, Southlake, TX (US); Ashok Raj Susairaju, Chennai (IN)

(73) Assignee: ACQUEON INC.

( * ) Notice: Subject to any disclaimer, the term of this patent is extended or adjusted under 35 U.S.C. 154(b) by 0 days.

(21) Appl. No.: 18/530,231

(22) Filed: Dec. 6, 2023

(51) Int. Cl.
*H04M 3/51* (2006.01)
(52) U.S. Cl.
CPC ................. *H04M 3/5175* (2013.01)
(58) Field of Classification Search
None
See application file for complete search history.

(56) References Cited

U.S. PATENT DOCUMENTS

| | | | | |
|---|---|---|---|---|
| 11,228,681 | B1* | 1/2022 | Rosenberg | H04M 3/5175 |
| 11,393,465 | B2 | 7/2022 | Lee et al. | |
| 11,776,544 | B2 | 10/2023 | Kim et al. | |
| 2004/0218751 | A1* | 11/2004 | Colson | H04M 3/51 |
| | | | | 379/265.09 |
| 2015/0381817 | A1* | 12/2015 | Zhao | H04L 65/4038 |
| | | | | 379/202.01 |
| 2020/0349614 | A1* | 11/2020 | Batcha | H04M 3/5141 |
| 2022/0005457 | A1 | 1/2022 | Balakrishnan et al. | |
| 2023/0055948 | A1* | 2/2023 | McCourt | G06F 40/35 |
| 2023/0188643 | A1* | 6/2023 | Bhattacharya | G06F 40/56 |
| | | | | 379/68 |
| 2023/0297778 | A1* | 9/2023 | Can | G06F 16/345 |
| 2023/0385557 | A1* | 11/2023 | Sabapathy | G06F 16/345 |
| 2023/0419051 | A1* | 12/2023 | Sabapathy | G06F 40/247 |
| 2024/0005085 | A1* | 1/2024 | Kukde | G06F 40/166 |

* cited by examiner

*Primary Examiner* — Nafiz E Hoque
(74) *Attorney, Agent, or Firm* — Galvin Patent Law LLC; Brian R. Galvin (57) ABSTRACT

A system and method for call transcription and summarization using generative artificial intelligence. The system combines Automatic Speech Recognition (ASR) technology to transcribe customer-call center agent conversations and a Generative AI (GAI) model for summarization. It starts by processing the audio conversation, converting spoken words into text using ASR. Then, the GAI model is employed to generate a coherent, concise summary of the transcribed conversation. The GAI model understands context, key points, and intent, allowing it to create summaries that capture essential information. It can handle diverse conversations, adapt to different languages, and handle various accents and speech patterns. The resulting summaries help call center agents review and respond to customer inquiries more efficiently, enhancing customer service quality and decision-making.

16 Claims, 8 Drawing Sheets

PLATFORM FOR CALL TRANSCRIPTION AND SUMMARIZATION USING GENERATIVE ARTIFICIAL INTELLIGENCE

CROSS-REFERENCE TO RELATED APPLICATIONS

Priority is claimed in the application data sheet to the following patents or patent applications, each of which is expressly incorporated herein by reference in its entirety:
None

BACKGROUND OF THE INVENTION

Field of the Art

The present invention is in the field of call center technologies, and more particularly to the use of generative artificial intelligence for call summarization.

Discussion of the State of the Art

In the realm of Generative Artificial Intelligence (GAI) systems for summarization tasks, the state of the art has been marked by significant advancements. Models like Generative Pre-trained Transformer 3 (GPT-3) and Bidirectional Encoder Representations from Transformers (BERT) have demonstrated impressive capabilities in the field of abstractive summarization. These models can generate coherent and contextually relevant summaries of text documents. Additionally, there is notable work on BERTSUM, a model specialized for extractive summarization, which utilizes BERT embeddings to select sentences from source documents to construct summaries. Moreover, Text-To-Text Transfer Transformer (T5) has emerged as an adaptable text-to-text model, showcasing promising results on various Natural Language Processing (NLP) tasks, including summarization, by framing summarization as a text-to-text problem.

However, despite these advancements, GAI systems for summarization come with their set of limitations. Notably, these systems often grapple with length constraints, being confined to a maximum token limit. This limitation can pose challenges when summarizing lengthy documents or generating comprehensive summaries. Furthermore, while these models can generate coherent text, their understanding of content remained somewhat shallow. Summaries were often generated based on statistical patterns in the training data, rather than a profound comprehension of the subject matter or rooted in any deeper context than what was provided in the source.

In terms of summarization approaches, abstractive methods, which involve generating new sentences, occasionally produce incorrect or nonsensical information. In contrast, extractive summarization methods, while more conservative, tend to offer greater reliability. Fine-tuning these GAI models for specific summarization tasks can also prove challenging, demanding substantial volumes of labeled data and expertise. Additionally, controlling the level of abstraction or specifying the desired summary length pose difficulties.

What is needed is a platform for call transcription and summarization using generative artificial intelligence which overcomes these limitations.

SUMMARY OF THE INVENTION

Accordingly, the inventor has conceived and reduced to practice, a system and method for call transcription and summarization using generative artificial intelligence. The system combines Automatic Speech Recognition (ASR) technology to transcribe customer-call center agent conversations and a Generative AI model for summarization. It starts by processing the audio conversation, converting spoken words into text using ASR. Then, the GAI model is employed to generate a coherent, concise summary of the transcribed conversation. The GAI model understands context, key points, and intent, allowing it to create summaries that capture essential information. It can handle diverse conversations, adapt to different languages, and handle various accents and speech patterns. The resulting summaries help call center agents review and respond to customer inquiries more efficiently, enhancing customer service quality and decision-making. Continuous refinement and fine-tuning of the GAI model are essential to ensure high-quality summaries.

According to a preferred embodiment, a system for transcription and summarization using generative artificial intelligence is disclosed, comprising: a computing device comprising a processor, a memory, and a non-volatile data storage device; a transcription service comprising a first plurality of programming instructions stored in the memory which, when operating on the processor, causes the computing device to: receive audio data of a call between a customer and a contact center agent; receive call context information from a contact center; generate a call transcription by using automatic speech recognition; link the call context information to the call transcription as context metadata; and send the call transcription to a summarization service; and the summarization service comprising a second plurality of programming instructions stored in the memory which, when operating on the processor, causes the computing device to: receive the call transcription, the call transcription comprising a transcribed conversation and context metadata; use the call transcription and the context metadata as an input prompt for a generative artificial intelligence (GAI) model configured to generate as output a call summary; and display the call summary on a computing device associated with the contact center agent.

According to another preferred embodiment, a method for transcription and summarization using generative artificial intelligence is disclosed, comprising the steps of: receiving audio data of a call between a customer and a contact center agent; receiving call context information from a contact center; generating a call transcription by using automatic speech recognition; linking the call context information to the call transcription as context metadata; sending the call transcription to a summarization service; receiving the call transcription, the call transcription comprising a transcribed conversation and context metadata; using the call transcription and the context metadata as an input prompt for a generative artificial intelligence (GAI) model configured to generate as output a call summary; and displaying the call summary on a computing device associated with the contact center agent.

According to an aspect of an embodiment, the context metadata comprises information indicating a first channel of the audio data as being associated with the customer and a second channel of the audio data as being associated with the contact center agent.

According to an aspect of an embodiment, the GAI model is trained using a plurality of customer conversational data.

According to an aspect of an embodiment, the call context information is received from a computer telephony integration (CTI) system operated by the contact center.

According to an aspect of an embodiment, the call context information comprises CTI event information associated with the call between the customer and the contact center agent.

According to an aspect of an embodiment, the contact center agent submits a request to the summarization service for a new summary.

According to an aspect of an embodiment, the summarization service is further configured to: receive the agent request for a new summary; use the call transcription and the context metadata as an input prompt for a second generative artificial intelligence (GAI) model configured to generate as output a new call summary; and display the new call summary on the computing device associated with the contact center agent.

According to an aspect of an embodiment, the agent request for a new summary comprises one or more configuration modifications; and wherein the one or more configuration modifications changes aspects of the input prompt.

According to an aspect of an embodiment, the summarization service is further configured to: receive the agent request for a new summary; use the call transcription, the context metadata, and configuration modifications as a modified input prompt for the GAI model configured to generate as output a new call summary; and display the new call summary on the computing device associated with the contact center agent.

According to an aspect of an embodiment, the contact center agent submits a request for a new call transcription; and wherein the new call transcription is used by the summarization service to generate the call summary.

DETAILED DESCRIPTION OF THE INVENTION

The inventor has conceived, and reduced to practice, a system and method for call transcription and summarization using generative artificial intelligence. The system combines Automatic Speech Recognition technology to transcribe customer-call center agent conversations and a Generative AI model for summarization. It starts by processing the audio conversation, converting spoken words into text using ASR. Then, the GAI model is employed to generate a coherent, concise summary of the transcribed conversation. The GAI model understands context, key points, and intent, allowing it to create summaries that capture essential information. It can handle diverse conversations, adapt to different languages, and handle various accents and speech patterns. The resulting summaries help call center agents review and respond to customer inquiries more efficiently, enhancing customer service quality and decision-making. Continuous refinement and fine-tuning of the GAI model are essential to ensure high-quality summaries, and data privacy and security measures are implemented to protect sensitive customer information.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1:
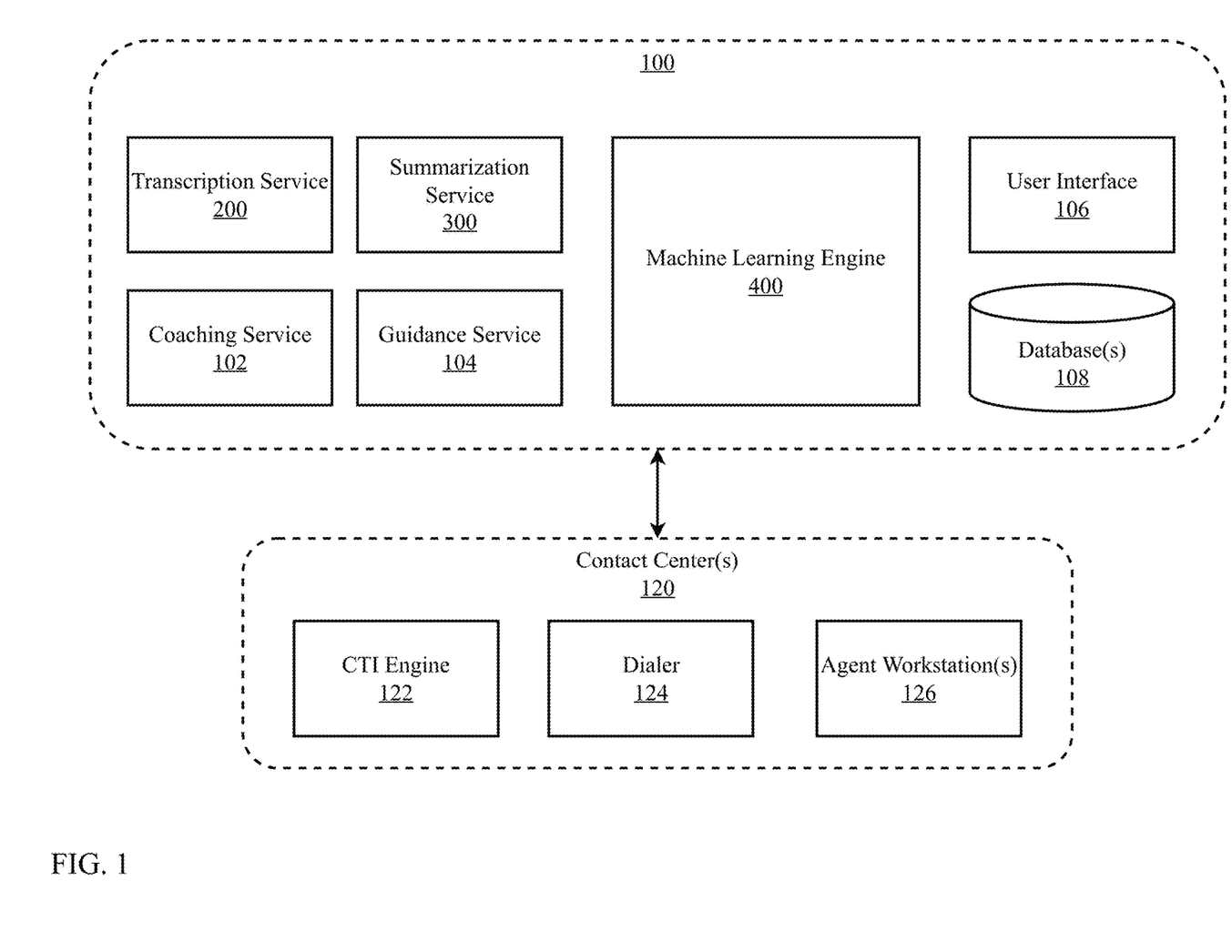
FIG. 1 is a block diagram illustrating an exemplary system architecture for a platform for call transcription and summarization using generative artificial intelligence, according to an embodiment.

FIG. 1 is a block diagram illustrating an exemplary system architecture for a platform for call transcription and summarization using generative artificial intelligence, according to an embodiment. According to the embodiment, platform 100 is configured to receive a plurality of data from a contact center 120 such as session (e.g., call, chat, etc.) data associated with an interaction between a customer and a contact center agent. For example, contact center 120 may comprise a computer telephony integration (CTI) engine 122 which can be provided to platform 100 a plurality of CTI event data which can be used to provide session context information associated with a call and/or chat between a customer and an agent. Similarly, contact center 120 may further comprise a dialer 124 which can provide session context such as the origination of the session (i.e., inbound call or outbound call) and the channels associated with the customer and the agent.

According to the embodiment, platform 100 comprises a plurality of services or micro-services which integrate with generative artificial intelligence (GAI) models trained for specific tasks such as, for example, conversation transcription 200 and/or summarization 300, agent coaching 102, and agent guidance 104, to name a few. A machine learning engine 400 is present and configured to create, maintain, and update various GAI models used to support the plurality of services. In some implementations, the GAI models are trained using a plurality of session data between customers and contact center agents. The session data presents a large corpus of customer/agent interactions which machine learning engine 400 can use as training data for the various GAI models which support platform services.

Machine learning (ML) engine 400 configured to train, maintain, and deploy one or more machine and/or deep learning models to provide call transcription, summarization, agent coaching and guidance. Machine learning engine 400 may receive, retrieve, or otherwise obtain a plurality of data which can be collected from various information sources including, but not limited to, customer conversational data, CTI event data, and "big data." Machine learning engine may use some or all the obtained data to develop one or more models for transcription and summarization. For a more detailed description of the machine learning engine 400, refer to FIG. 4

In operation, transcription service 200 utilizes a trained transcription model to perform call/chat transcription on a session between a customer and an agent. Transcription service 200 may also receive a variety of session context information and then add some of the context information to the transcription it produces. The result is context-aware transcription data which can be used for downstream processes such as being sent to database(s) 108 for storage and/or to summarization service 300 which processes the context-aware transcription data with a trained summarization model to create a summary of the session (e.g., conversation) between the customer and the agent once a session has terminated.

According to the embodiment, platform 100 further comprises a coaching service 102 and a guidance service 104 which can leverage GAI models and both the transcription and summarization services to provide contact center agents with context-aware coaching and/or guidance with respect to customer/session interaction. For example, summarization service 300 can provide a conversation summary to coaching service 102 which can analyze the conversation information and flow to determine areas of conversation where the agent can improve. For example, in the case of an outbound call campaign coaching service 102 and or guidance service 104 may be configured to provide the agent with talking points, prompts, or personalized responses to customer comments. In an embodiment, the system may store and/or utilize different prompts based on various campaign categories associated with outbound campaigns. As another example, guidance service 104 may determine in real time that a customer's sentiment is becoming negative during a conversation and may send a prompt to the agent workstation 126 informing the agent of the customer's changing disposition and an action/comment for the agent to make to improve the customer's sentiment.

A user interface (UI) 106 is present and configured to provide a means for platform users to interact with the services provided. In an implementation, UI 106 is configured to allow for data labelling which can be used for model training purposes by machine learning engine 400. In such an implementation, this enables supervised learning and allows models to be fine-tuned while also reducing the feedback cycle because domain experts can provide labeled data.

In some embodiments, platform 100 may be configured to operate on-premises at a call center 120. In other embodiments, platform 100 is configured to operate as a cloud-based service which communicates with one or more contact centers 120 via suitable communication network such as the Internet. In yet another embodiment, platform 100 may be configured to operate as a hybrid on-premises and cloud-based offering wherein one or more of the services provided by platform 100 may operate on an on-premises computing device while other platform services are offered via the cloud. In such an embodiment, some services may be implemented on-premises to reduce latency and improve computational resource usage.

Figure 2:
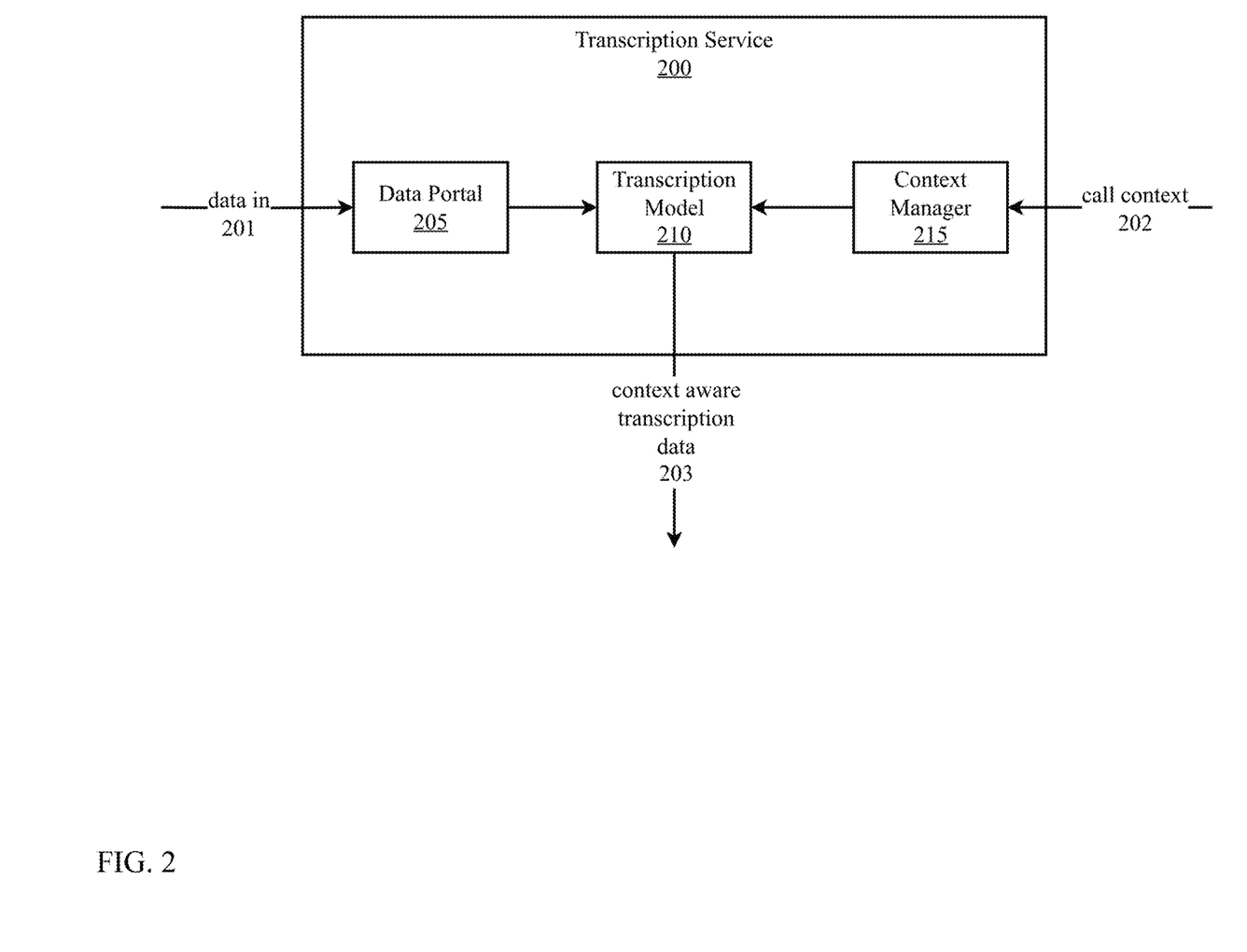
FIG. 2 is a block diagram illustrating an exemplary aspect of a platform for call transcription and summarization using generative artificial intelligence, the transcription service.

FIG. 2 is a block diagram illustrating an exemplary aspect of a platform for call transcription and summarization using generative artificial intelligence, the transcription service 200. According to the embodiment, transcription service 200 comprise a data portal 205 configured to receive a plurality of input data 201 from one or more contact centers, a trained GAI transcription model 210 which takes as input data processed by data portal 205 and produces as output a conversation transcription between a customer and a contact center agent. Also present in this embodiment is a context manager 215 which can receive, retrieve, or otherwise obtain call/session context information 202 from one or more sources. For example, a dialer 124 or CTI engine 122 can provide call context information 202 to context manager 215. CTI engine 122 can provide call context information in the form of CTI event data. When a customer calls the contact center, CTI engine 122 can trigger an event where the caller's information and history (if available) pop up on the agent's computer screen 126, providing the agent with relevant customer data before they even answer the call. This pop-up information can be provided as call context information, according to an embodiment. Additionally, CTI engine 122 can route incoming calls to the most appropriate agent or department based on predefined criteria, such as customer profiles, previous interactions, or IVR (Interactive Voice Response) selections. This routing information can be included as call context information, according to an embodiment. Context manager 215 may add context information to the transcription data which results in context-aware transcription data 203. The context aware transcription data 203 may be stored in database 108 and/or sent to summarization service 300 wherein the transcribed conversation may be summarized using a trained GAI model.

According to the embodiment, data portal 205 may be configured to pre-process input data for processing by transcription model 210. Before speech data can be accurately processed by transcription model 210, several preprocessing steps may be performed to improve the quality and reliability of the transcription process. Some common steps can include, but are not limited to, audio signal processing (e.g., sampling rate conversion, normalization, filtering, resampling, etc.), feature extraction (e.g., convert raw audio signal into a set of acoustic features, such as Mel-frequency cepstral coefficients, spectrograms, or filter banks), segmentation, language and acoustic model selection, data cleaning (e.g., remove any non-speech audio, silences, or other artifacts that are not relevant to the transcription task), and grammar and vocabulary preparation, to name a few. Pre-processed data may be sent to transcription model 210.

According to the embodiment, transcription model 210 is configured to process session data between a customer and an agent to produce a transcription of the conversation between those two parties during the session. In some implementations, transcription model 210 is an automatic speech recognition model trained using GAI techniques. In an implementation, the GAI techniques include a large language model (LLM) trained using a plurality of customer conversational data and/or recordings.

According to some embodiments, platform 100, via transcription service 200, blends call context information 202 with the transcription service 200 to improve diarization (partitioning speakers). Since the CTI engine is aware of whether the call is inbound or outbound, it can also provide information about which channel is associated with the customer and which channel is associated with the agent when sending the voice stream 201 to the transcription service 200. CTI engine 122 may also provide insights of whether the call is inbound or outbound or a chat. These insights may be included as additional contextual information when data is sent to the summarization service 300. For example, contextual information may indicate that the conversation was initiated by the customer to the agent (inbound) or by the agent to the customer (outbound) and may be included in the transcribed data 203 processed by transcription service 200 and subsequently summarized via summarization service 300.

Figure 3:
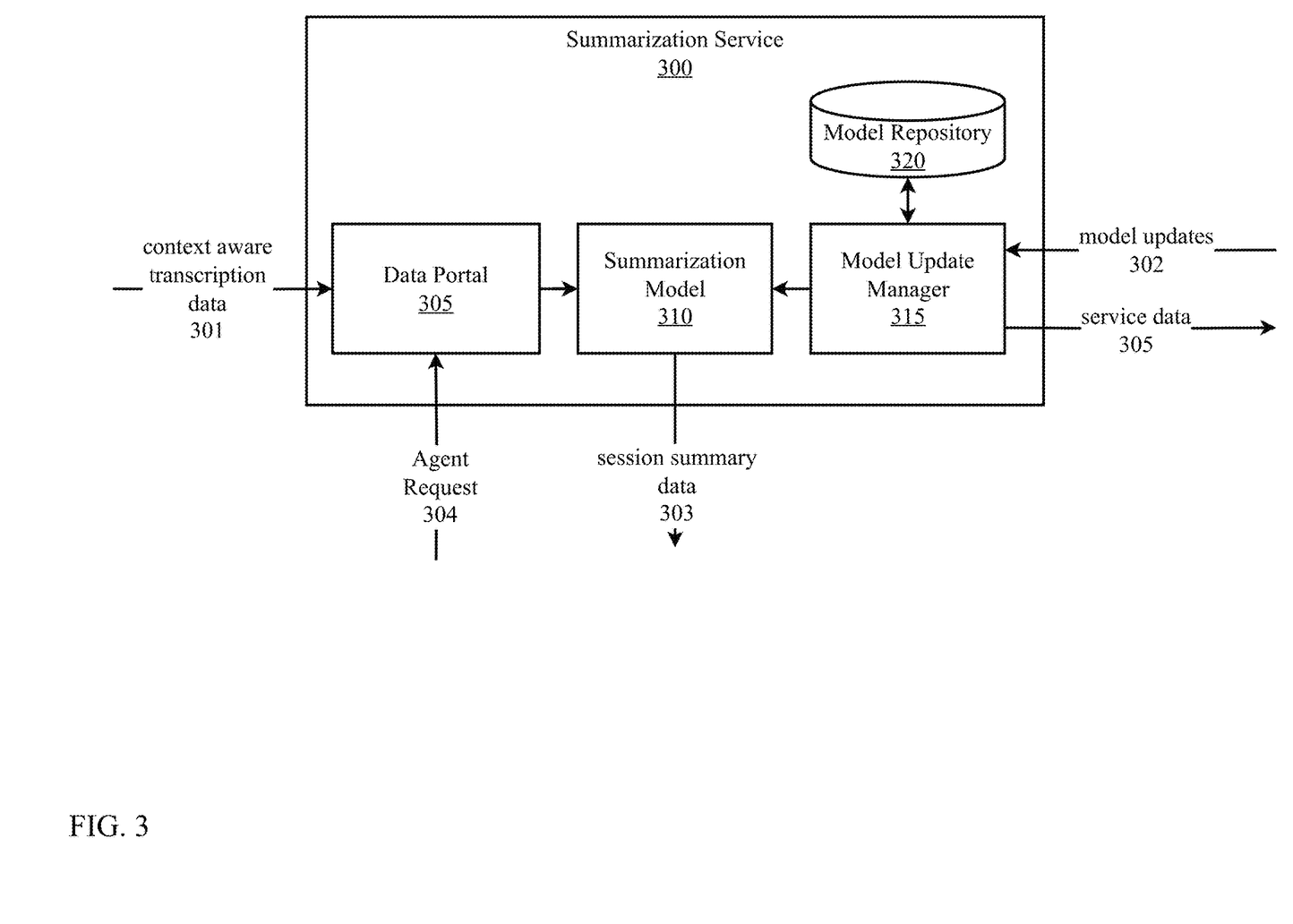
FIG. 3 is a block diagram illustrating an exemplary aspect of a platform for call transcription and summarization using generative artificial intelligence, the summarization service.

FIG. 3 is a block diagram illustrating an exemplary aspect of a platform for call transcription and summarization using generative artificial intelligence, the summarization service 300. According to the embodiment, summarization service 300 comprises a data portal configured to receive, retrieve, or otherwise obtain transcription data. The transcription data may be obtained from a database 108 or directly from transcription service 200. In some implantations, the transcription data is context-aware transcription data. According to the embodiment, a data portal 305 is present and configured to prepare obtained data for processing by summarization model 310. Data portal 305 may perform one or more (or none) data pre-processing operations on the input data 301 including, but not limited to, text cleaning (e.g., remove any special characters, symbols, or formatting issues from the transcription data to ensure that the text is clean and well-structured), tokenization (e.g., tokenize the text into words, phrases, or sentences, depending on the granularity of summarization required), stop word removal (e.g., eliminate common stop words (e.g., "and," "the," "in") that may not contribute significantly to the content of the summary), lemmatization and stemming (e.g., apply lemmatization or stemming techniques to reduce words to their base or root form), entity recognition (e.g., identify and mark entities— e.g., names of people, places, organizations—in the text), sentence segmentation (e.g., split the text into sentences, ensuring that the summary retains the original conversation's structure and flow), and language model selection (e.g., choose an appropriate GAI model that is trained on the language and domain relevant to the transcription data), to name a few. Pre-processed data may be sent to transcription model 310.

Summarization model 310 is configured to receive as input transcription data 301 associated with a session (e.g., conversation) between a customer and a contact center agent and generate as output a summary of session (e.g., conversation) 303. According to some embodiments, summarization model 310 is a generative artificial intelligence model trained to provide a summary of a conversation based on a prompt. According to an embodiment, the prompt comprises at least context-aware transcription data. In some implementations, summarization model 310 leverages LLMs to provide GAI capabilities. In some implementations, based on CTI event data (or other contact center data), the prompt generated for summarization model 310 will explicitly identify the direction of the call, which the LLM model can automatically include in the summarization. This also helps improve the accuracy of the summarization. Summarization model 310 may comprise more than one version of the model. Summarization model 310 may be implemented using various AI architecture known in the art including, but not limited to, generative pre-trained transformers, bidirectional and auto-regressive transformers, bidirectional encoder representations from transformers, text-to-text transfer transformer, neural networks, and the like.

In an embodiment, summarization model may be configured to fit (e.g., create, generate, produce, etc.) the summary to a template pre-determined by a user based on industry standards for quick reference and interpretation by other agents and business users. For example, industry specific abbreviations and cryptic messages may be used when generating summaries. This can improve storage of the summary information into confined field space in backend systems such as CRM systems.

According to some implementations, summarization service 300 may be configured to provide a contact center agent with a new summary if the agent is not happy with the initial summary presented by summarization service 300. This may be achieved, for example, by the agent by either modifying the prompt configuration (e.g., add additional scripts to modify the prompt) from their desktop (or other computing device) at their workstation 126, and/or by changing the style of summarization (e.g., to be abstract, descriptive, creative, serious, terse, sanctimonious, etc.). An agent may send a request 304 with the modified configuration to data portal which can prepare and submit the request to summarization model 310. Additionally, or alternatively, an agent can request 304 a new summary without modifying the prompt configuration. In some implementations, when an agent request for a new summary without prompt modifications is received an alternate version of summarization model 310 may be prompted to generate the new summary.

In some embodiments, system can utilize two or more separate GAI models wherein each model generates a summary. Each of the plurality of summaries can be presented to the agent simultaneously and allow the agent to pick the best result. The summary selected by the agent (i.e., best result) may be stored and used in future model training processes. In another embodiment, two or more transcription models may be used wherein each models generates a transcription. Each of these transcriptions may be fed into a summary model to produce a summary for each transcription. Each of these summaries may be sent to an agent wherein the agent can select the best answer. This selection may be stored and used in future model training processes. In this way A/B testing can be performed, wherein the summary most often accepted by the agents can be made the default prompt automatically.

A model update manager 315 is present and configured update summarization model 310 when updated versions 302 of model are ready for deployment in a production environment. Model manager 315 may also be configured to change the operating model when an agent request 304 for a new summary without changing the prompt configuration is received at data portal 305. Data portal may send a signal to change the summarization model 310 to model update manger 315 which can select a different model version from model repository 320. Model updates 302 may be received from machine learning engine 400. Model update manager 315 may periodically send service data 305 to machine learning engine 400. The data sent from model updated manager 315 to machine learning engine 400 may comprise model prompts, agent requests, model performance metrics, model output, and/or the like. Machine learning engine 400 may use this information for various purposes including model training, dataset curation, parameter/hyperparameter tuning, model performance scoring/calculation, and/or the like.

In some implementations, the various models described herein may be selected based on various criteria. For example, a first summarization model may be selected if the call is associated with an outbound call campaign, and a second summarization model may be selected if the call is an inbound call. In the case of an inbound call, the model may be differentiated by case-specific skill, for example if the call is about making a payment on an account, then an enterprise specific model may be selected to provide the conversation summary. In some implementations, model may be selected based on the destination of where the call the is routed. In some implementations, two or more transcription and/or summarization models may be used simultaneously to enable A/B testing and reporting on them. In some implementations, two or more results (e.g., summaries) may be displayed to an agent at their workstation 126 and the agent is allowed to choose and report on them. In some implementations, the agent may request a new transcription. In such an embodiment, the new transcription is sent to summarization service 300 for generation of a new summary. In some implementations, a call may be segmented or prioritized based on the summary to help improve the efficiency of an outbound call campaign.

Figure 4:
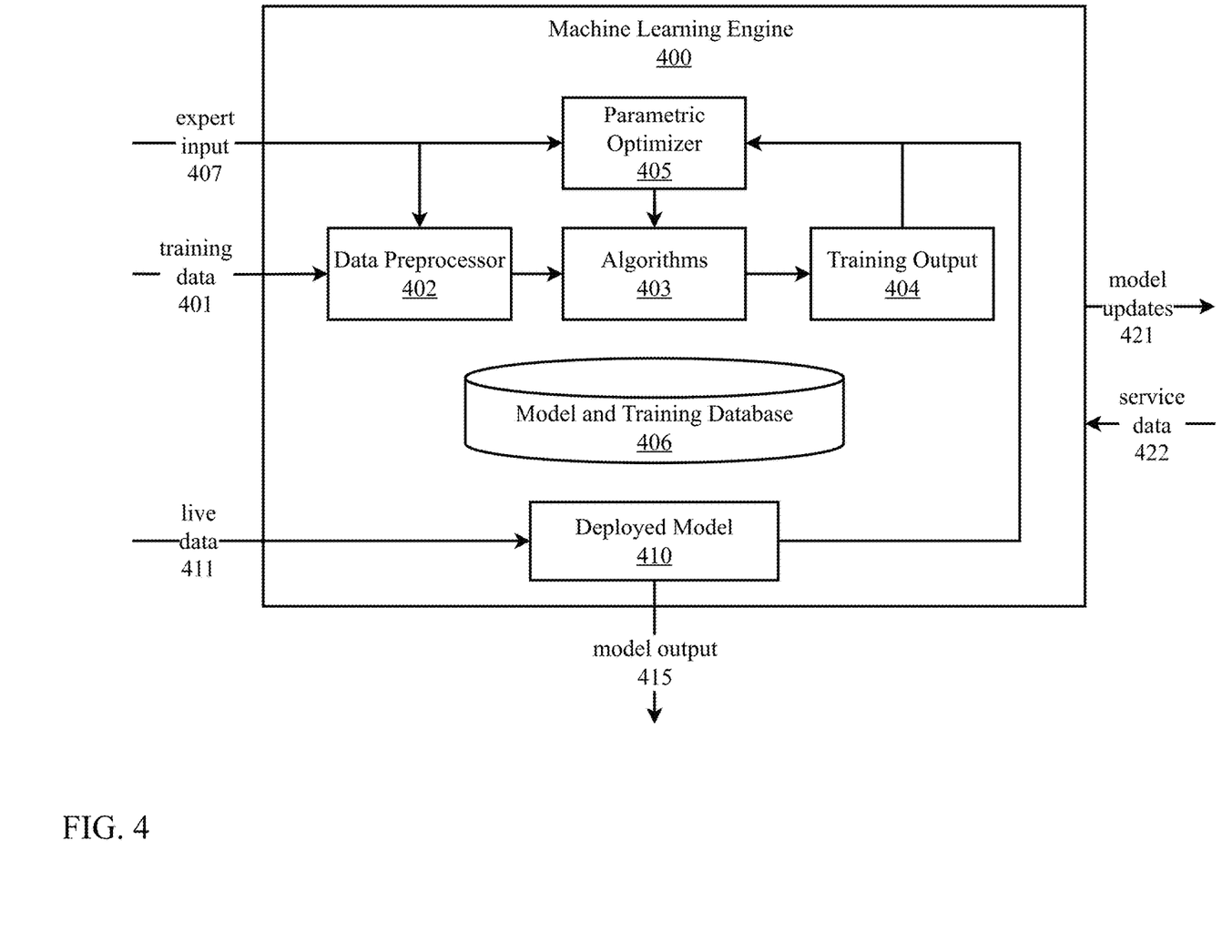
FIG. 4 is a block diagram illustrating an exemplary aspect of a platform for call transcription and summarization using generative artificial intelligence, the machine learning engine.

FIG. 4 is a block diagram illustrating an exemplary aspect of a platform for call transcription and summarization using generative artificial intelligence, the machine learning engine 400. According to the embodiment, machine learning engine may comprise a model training stage comprising a data preprocessor 402, one or more machine and/or deep learning algorithms 403, training output 404, and a parametric optimizer 405, and a model deployment stage comprising a deployed and fully trained model 410 configured to perform tasks described herein such as transcription, summarization, agent coaching, and agent guidance. ML engine 400 may be used to train and deploy transcription model 210 and summarization model 310 in order to support the services provided by platform 100.

At the model training stage, a plurality of training data 401 may be received at machine learning engine 400. In some embodiments, the plurality of training data may be obtained from one or more database(s) 108 and/or directly from various information sources such as a plurality of contact centers 120. In a use case directed to customer-agent conversation transcription and summarization, a plurality of training data may be sourced from customer conversational data and/or recordings. Customer conversational data refers to data collected from interactions (e.g., individual sessions or across a series of sessions) or conversations with customers. It could include audio recordings, text transcripts, or other forms of data. Data preprocessor 402 may receive the input data (e.g., customer conversational data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machine and/or deep learning algorithms 403 to train a predictive model for object monitoring and detection.

Machine learning engine 400 may utilize the customer conversational data to generate ground-truth data. Ground-truth data is typically a high-quality, accurate reference dataset that serves as a benchmark or gold standard. For example, a LLM model can be used to create this reference dataset from customer conversational data or recordings. Once the ground-truth data is generated, it is used to refine or fine-tune smaller versions of the transcription/summarization models and possibly other language models (LLMs). Fine-tuning involves adjusting the model's parameters to make it perform better on specific tasks or data. In this case, the goal is to improve the model's performance on customer conversational data. The fine-tuned models are expected to provide improved accuracy when processing customer conversational data, which can be crucial for applications like natural language understanding and processing. The refined models can be optimized for real-time processing, meaning they can quickly analyze and understand customer conversations as they happen. Additionally, by using the smaller, fine-tuned models instead of a larger model for routine tasks, platform 100 reduces computational costs associated with AI processing.

During model training, training output 404 is produced and used to measure the accuracy and usefulness of the predictive outputs. During this process a parametric optimizer 405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 400 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few.

According to an embodiment, the training output 404 produced by the model is validated by subject matter experts. Experts may utilize UI 106 to submit labeled data which can be obtained by data preprocessor 402 and added to the training corpus. The expert's annotations 407 may then be used to in the next round of model training, improving the process and increasing model performance. This is essential in ensuring the models perform well across various domains and significantly reduces overhead from a modeling standpoint.

The test dataset can be used to test the accuracy of the model outputs. If the training model is making predictions that satisfy a certain criterion (e.g., baseline behavior, minimized WER, etc.), then it can be moved to the model deployment stage as a fully trained and deployed model 410 in a production environment making predictions based on live input data 411 (e.g., customer conversation data). For example, if deployed model is a transcription model 210 then it can output a context-aware transcription 415 comprising a transcription of a customer conversation as well as contextual data/metadata associated with the session between the customer and the agent. Further, model predictions made by deployed model can be used as feedback and applied to model training in the training stage, wherein the model is continuously learning over time using both training data and live data and predictions.

A model and training database 406 is present and configured to store training/test datasets and developed models. Database 406 may also store previous versions of models. Database 406 may be a part of database(s) 108 band/or model repository 320.

According to the embodiment, machine learning engine 400 may periodically send model updates 421 to various services which can apply the model updates to the GAI models operating therein. Machine learning engine 400 may receive service data 422 from the various services provided by platform 100. Service data 422 may be used by machine learning engine 400 to evaluate model performance, apply feedback to the training loop of a model, adjust model parameters, and/or to update the training corpus. For example, summarization service 300 may send service data comprising agent requests for a new summary and the most often agent-selected summary to machine learning engine 400 which in turn uses this information to adjust the model accordingly.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 403 may comprise a deep learning algorithm such as neural networks (e.g., recurrent, convolutional, long short-term memory networks, etc.).

In some implementations, ML engine 400 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 108.

Detailed Description of Exemplary Aspects

Figure 5:
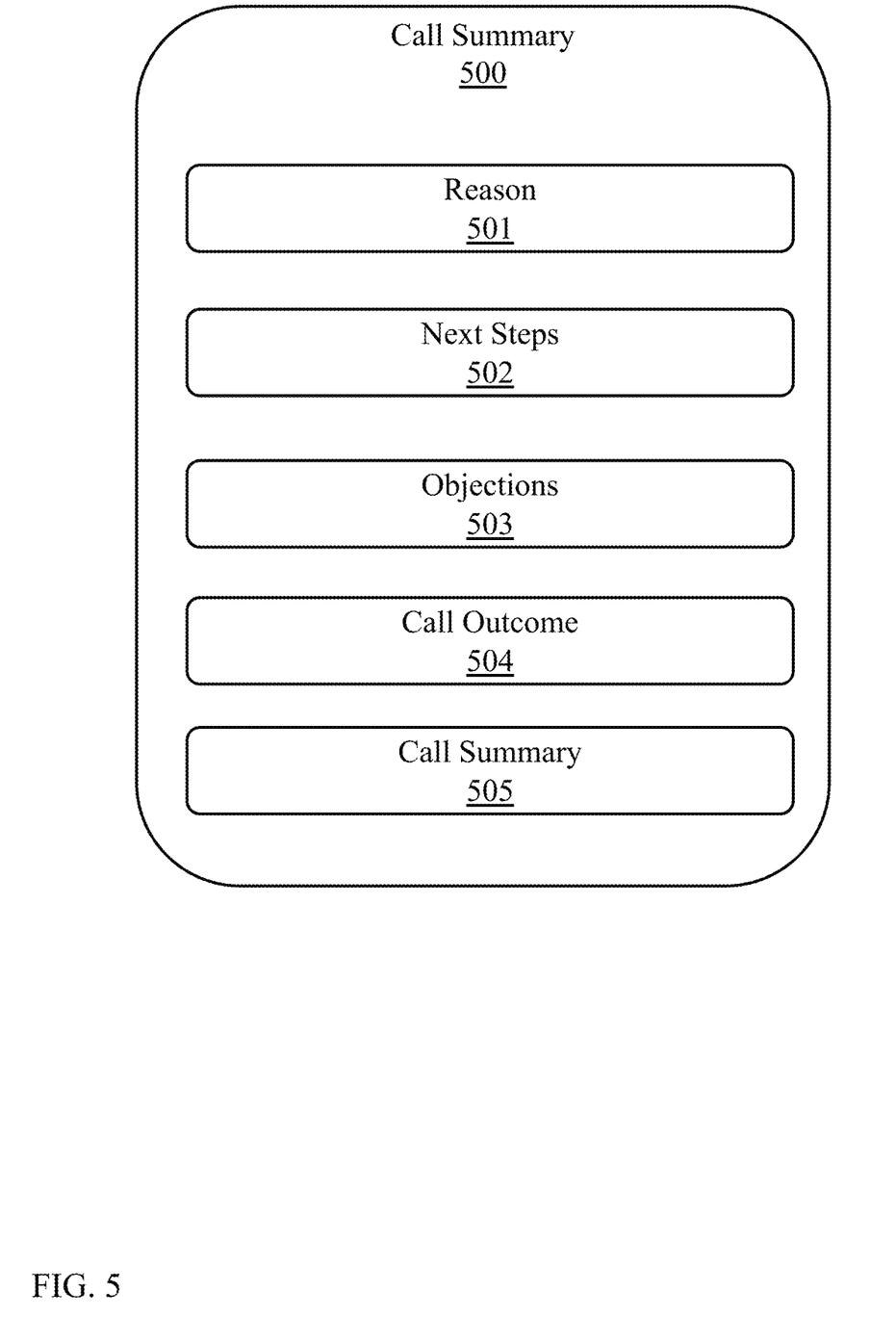
FIG. 5 is a diagram illustrating an exemplary call summary that may be produced by a platform for call transcription and summarization using generative artificial intelligence, according to an embodiment.

FIG. 5 is a diagram illustrating an exemplary call summary 500 that may be produced by a platform for call transcription and summarization using generative artificial intelligence, according to an embodiment. The system is configurable to be operable with a variety of endpoint systems and devices which may be used in a contact center environment and/or at an agent workstation. The user interface 106 is flexible enough to render the summary in a format which is compatible with a desired endpoint. For example, the summary may use a JSON format to render the information to the agent. According to the embodiment, summarization service 300 may generate a call summary 500 associated with a conversation between an agent and a customer. The call summary does not necessarily have to summarize a telephone (i.e., voice) call between a customer and agent, as summarization service 300 can also provide summaries of chat (i.e., text) sessions between a customer and agent. A call summary 500 may comprise one or more fields or sections 501-505 which may comprise data associated with said field. The sections displayed in the summary may be based on the prompt given to the summarization model 310. Based on the prompt and sections sent, the agent workstation 126 computing device can dynamically change to accommodate and display all relevant sections. In an implementation, database 108 is configured to store the dynamic structure as JSON format to store the various sections requested by the prompt.

As illustrated in this example, call summary 500 comprises five sections associated with the reason for the call 501, next steps associated with the call 502, objections 503, call outcome 504, and the call summary 505. The reason section 501 may display the reason, as determined by the summarization model, for the call between the customer and the agent. For an inbound call, the reason may be "bill payment", "account settings", "login help", or various other reasons which may cause a customer to call a call center. In the case of an outbound call, the reasons section may display the outbound call campaign associated with the call.

A next steps section 502 is shown and may comprise a plurality of steps or actions to be taken because of the conversation between the customer and the agent. The next steps may be steps that the agent must perform, the customer must perform, an automated step that must be performed, or some combination thereof. For example, the next steps section 502 may be configured to trigger a different contact life cycle like close contact, reschedule contact, set personal call back, etc., as well as take traditional actions such as campaign chaining (e.g., move or copy a contact to different campaign), trigger an robotic process automation (RPA), or other actions based on the specific section of the summary. According to an aspect, call disposition or call outcome 504 may be set by machine learning in order to provide data to reporting and workflow systems within a call center.

An objections section 503 is shown and may comprise points of disagreement or issues raised by the customer during a customer service call or support interaction. These objections can vary widely depending on the nature of the call, the customer's concerns, and the product or service involved. Some common objections can include, but are in no way limited to, price objections, product or service quality, billing or payment issues, delivery or shipping problems, technical issues, cancellation or refund requests, policy disputes, customer service experience, competitive offers, misunderstandings, privacy and security concerns, and compliance and legal issues. Handling objections effectively is a crucial skill for call center agents. The goal is to resolve the customer's concerns and provide a positive customer service experience. Different call centers may have their own specific procedures and scripts for handling objections, but the key is to address the customer's concerns professionally and with the aim of finding a satisfactory resolution.

A call outcome section 504 is shown and may comprise information associated with the ultimate outcome of the call. A call summary section 505 is also present and may comprise the summary as produced by summarization model 310. In some implementations, an agent may request a new call summary 505 if they do not find the initial call summary satisfactory.

Figure 6:
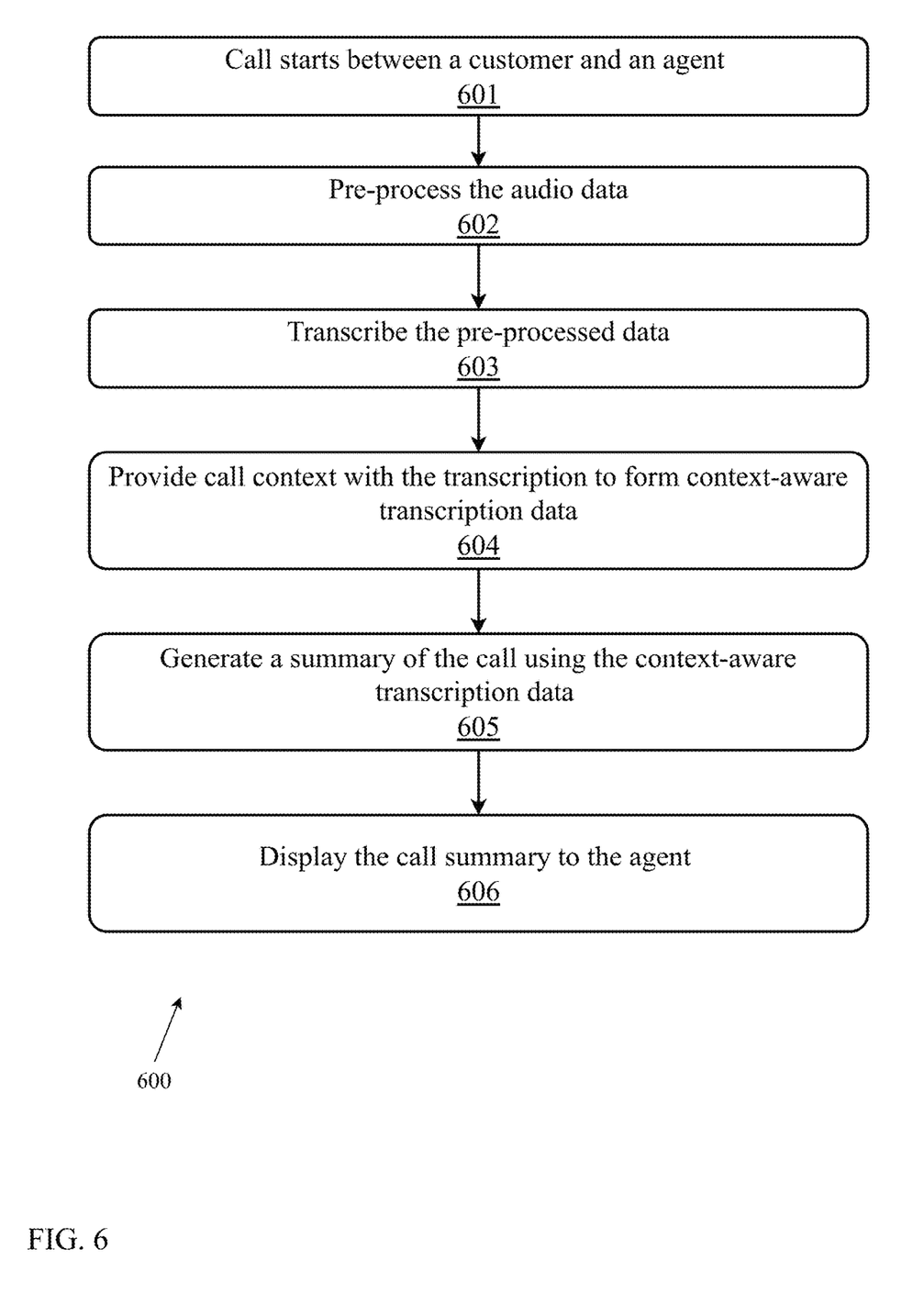
FIG. 6 is a flow diagram illustrating an exemplary method for producing a call summary, according to an embodiment.

FIG. 6 is a flow diagram illustrating an exemplary method 600 for producing a call summary, according to an embodiment. According to the embodiment, the process begins at step 601 when a call between a customer and an agent starts and platform 100 receives audio data from both channels (customer and agent channels). At step 602, transcription service 200 may pre-process the audio data to prepare it for transcription at step 603. Transcription service 200 may receive call center information which can be used to provide context to the call. At step 604, the provided call center information may be blended with the transcription to form context-aware transcription data. The context-aware transcription data may be used as input to a GAI summarization model 310 at step 605 to generate a summary of the call. In some implementations, summarization model 310 may accept a prompt to be summarized, wherein the prompt comprise context-aware transcription data associated with the call between the customer and the agent. In some implementations, the selection of the summarization model 310 may be based on call context such as, for example, whether the call is an inbound or outbound call, the campaign associated with an outbound call, a skill level associated with the routed call, and various other reasons that may indicate a specific type or version of a model is used for generating a summary. As last step, platform 100 displays the call summary to the agent via their computing device at their workstation 126.

Figure 7:
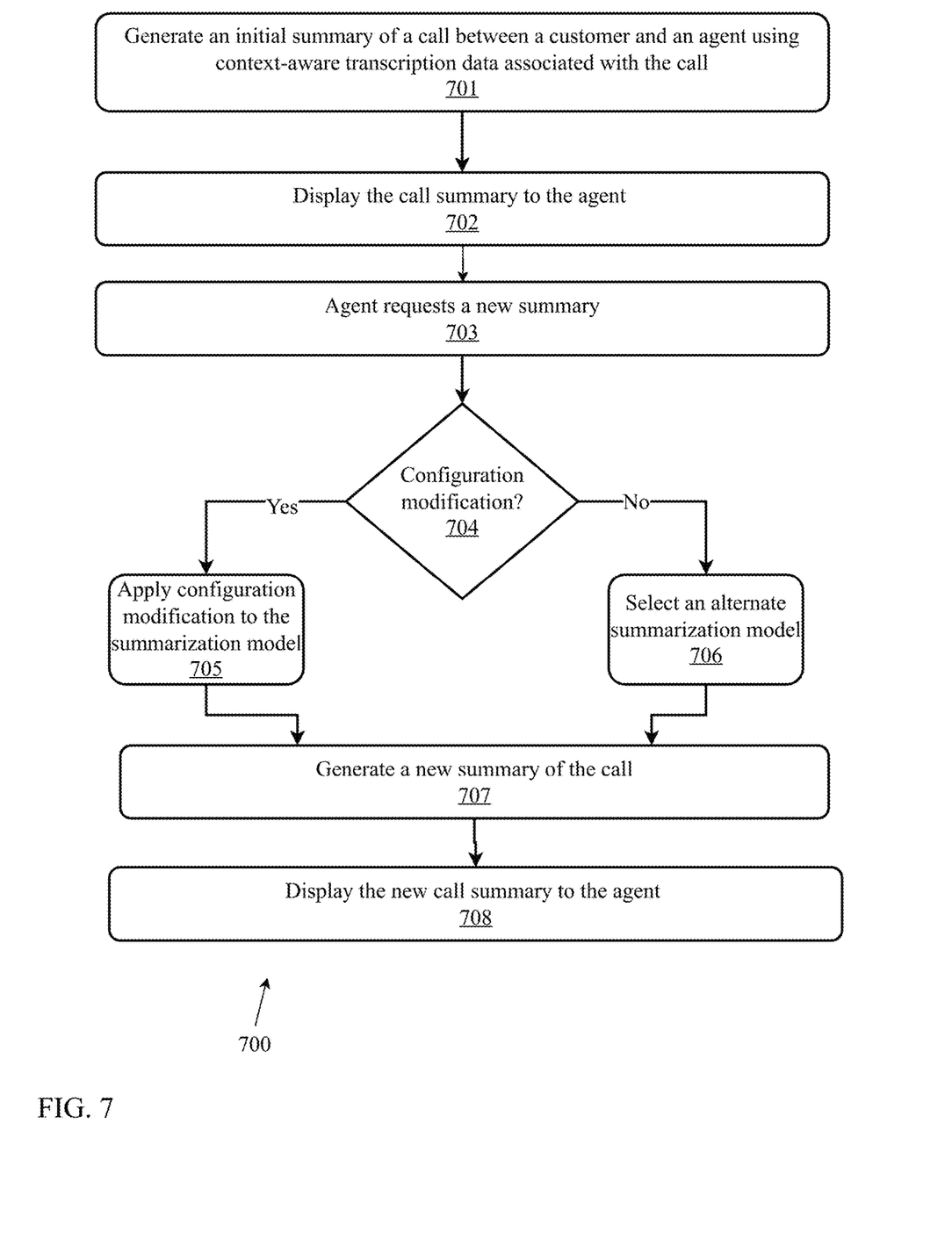
FIG. 7 is a flow diagram illustrating an exemplary process method for generating a new summary based on an agent request, according to an embodiment.

FIG. 7 is a flow diagram illustrating an exemplary process method 700 for generating a new summary based on an agent request, according to an embodiment. According to the embodiment, the process begins at step 701 when summarization service 300 generates an initial summary of a call between an agent and a customers using context-aware transcription data associated with the call. At step 702, the initial summary is displayed to the agent at their workstation. At step 703, the agent can reject the summary at their discretion and submit a request to platform 100 for a new summary. Platform 100 can receive the request and perform a check 704 on the request to determine if the request comprises any configuration modifications. If it is determined that the agent request contains configuration modifications, then the process proceeds to step 705 wherein summarization service 300 applies the configuration modifications to the summarization model (e.g., tweaks the prompt submitted to the model) which can generate a new summary of the call at step 707. If, instead, at check 704 it is determined that the agent request did not contain any configuration modifications, then the process proceeds to step 706 wherein summarization service 300 selects an alternate summarization model to process the context-aware transcription data to generate a new summary of the call at step 707. The last step 708 involves displaying the new summary to the agent at their workstation. Platform 100 may make changes to the models/prompt configurations based on metrics and criteria associated with the agent requests.

Exemplary Computing Environment

Figure 8:
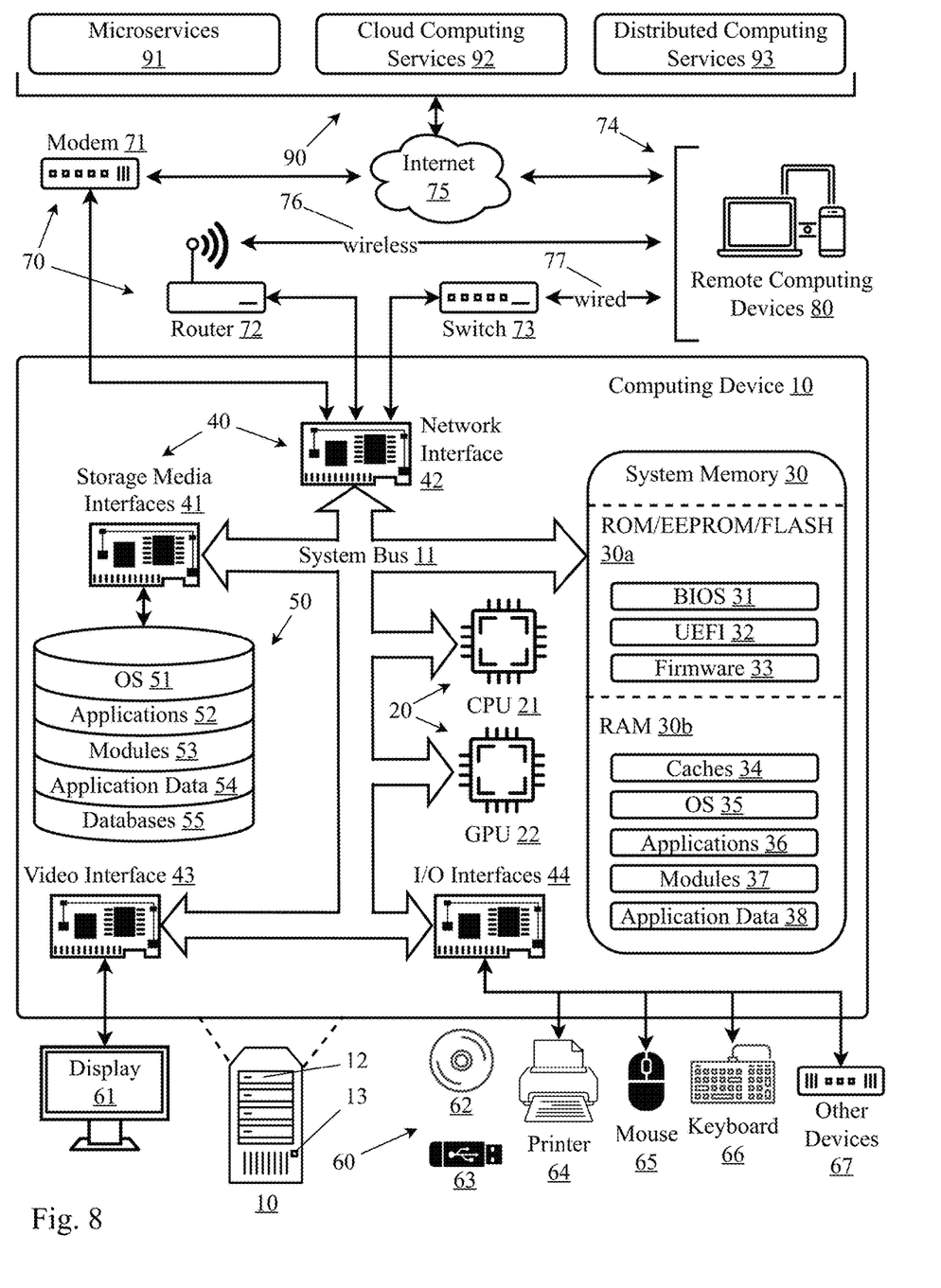
FIG. 8 illustrates an exemplary computing environment on which an embodiment described herein may be implemented.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for transcription and summarization using generative artificial intelligence, comprising:
  a computing device comprising a processor, a memory, and a non-volatile data storage device;
  a transcription service comprising a first plurality of programming instructions stored in the memory which, when operating on the processor, causes the computing device to:
    receive audio data of a call between a customer and a contact center agent;
    receive call context information from a contact center;
    generate a call transcription by using automatic speech recognition;
    link the call context information to the call transcription as context metadata; and send the call transcription, including both the transcribed conversation and context metadata, to a summarization service; and the summarization service comprising a second plurality of programming instructions stored in the memory which, when operating on the processor, causes the computing device to:

receive the call transcription, the call transcription comprising a transcribed conversation and context metadata;

use the call transcription and the context metadata as an input prompt for a generative artificial intelligence (GAI) model configured to generate as output a call summary; and display the call summary on a computing device associated with the contact center agent;

wherein, upon receipt of a request from the call center agent request for a new summary, the summarization service:

uses the call transcription and the context metadata as an input prompt for a second generative artificial intelligence (GAI) model configured to generate as output a new call summary; and displays the new call summary on the computing device associated with the contact center agent.

2. The system of claim 1, wherein the context metadata comprises information indicating a first channel of the audio data as being associated with the customer and a second channel of the audio data as being associated with the contact center agent.

3. The system of claim 1, wherein the GAI model is trained using a plurality of customer conversational data.

4. The system of claim 1, wherein the call context information is received from a computer telephony integration (CTI) system operated by the contact center.

5. The system of claim 4, wherein the call context information comprises CTI event information associated with the call between the customer and the contact center agent.

6. The system of claim 1, wherein the agent request for a new summary comprises one or more configuration modifications; and wherein the one or more configuration modifications changes aspects of the input prompt.

7. The system of claim 6, wherein the summarization service is further configured to:

receive the agent request for a new summary;

use the call transcription, the context metadata, and configuration modifications as a modified input prompt for the GAI model configured to generate as output a new call summary; and display the new call summary on the computing device associated with the contact center agent.

8. The system of claim 1, wherein the contact center agent submits a request for a new call transcription; and wherein the new call transcription is used by the summarization service to generate the call summary.

9. A method for transcription and summarization using generative artificial intelligence, comprising the steps of:

receiving audio data of a call between a customer and a contact center agent;

receiving call context information from a contact center;

generating a call transcription by using automatic speech recognition;

linking the call context information to the call transcription as context metadata;

sending the call transcription, including both the transcribed conversation and context metadata, to a summarization service;

receiving the call transcription, the call transcription comprising a transcribed conversation and context metadata;

using the call transcription and the context metadata as an input prompt for a generative artificial intelligence (GAI) model configured to generate as output a call summary; and displaying the call summary on a computing device associated with the contact center agent;

wherein, upon receipt of a request from the call center agent request for a new summary, the summarization service:

uses the call transcription and the context metadata as an input prompt for a second generative artificial intelligence (GAI) model configured to generate as output a new call summary; and displays the new call summary on the computing device associated with the contact center agent.

10. The method of claim 9, wherein the context metadata comprises information indicating a first channel of the audio data as being associated with the customer and a second channel of the audio data as being associated with the contact center agent.

11. The method of claim 9, wheSteerein the GAI model is trained using a plurality of customer conversational data.

12. The method of claim 9, wherein the call context information is received from a computer telephony integration (CTI) system operated by the contact center.

13. The method of claim 12, wherein the call context information comprises CTI event information associated with the call between the customer and the contact center agent.

14. The method of claim 9, wherein the agent request for a new summary comprises one or more configuration modifications; and wherein the one or more configuration modifications changes aspects of the input prompt.

15. The method of claim 14, wherein the summarization service is further configured to:

receive the agent request for a new summary;

use the call transcription, the context metadata, and configuration modifications as a modified input prompt for the GAI model configured to generate as output a new call summary; and display the new call summary on the computing device associated with the contact center agent.

16. The method of claim 9, wherein the contact center agent submits a request for a new call transcription; and wherein the new call transcription is used by the summarization service to generate the call summary.

* * * * *